United States Patent
Kennedy

(10) Patent No.: US 7,526,314 B2
(45) Date of Patent: Apr. 28, 2009

(54) REMOTE DATA STORAGE AND RETRIEVAL FOR PORTABLE ELECTRONICS

(75) Inventor: Richard Kennedy, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1772 days.

(21) Appl. No.: 10/080,999

(22) Filed: Feb. 20, 2002

(65) Prior Publication Data

US 2003/0157960 A1    Aug. 21, 2003

(51) Int. Cl.
*H04M 1/00*    (2006.01)
(52) U.S. Cl. .................. 455/556.1; 455/414.1
(58) Field of Classification Search ............. 455/556.1, 455/556.2, 557, 558, 66.1; 343/702; 348/231.1, 348/231.2, 231.3, 231.7, 231.6, 714
See application file for complete search history.

(56) References Cited

U.S. PATENT DOCUMENTS

| | | | |
|---|---|---|---|
| 5,893,037 A * | 4/1999 | Reele et al. .............. 455/556.1 |
| 6,278,884 B1 * | 8/2001 | Kim .......................... 455/556.1 |
| 6,300,976 B1 * | 10/2001 | Fukuoka ................. 348/231.99 |
| 6,526,351 B2 * | 2/2003 | Whitham ..................... 701/211 |
| 6,526,352 B1 * | 2/2003 | Breed et al. ................. 701/213 |
| 6,657,660 B2 * | 12/2003 | Shiota et al. ................ 348/714 |
| 6,677,904 B2 * | 1/2004 | Lichtfuss ..................... 343/702 |
| 6,681,120 B1 * | 1/2004 | Kim .......................... 455/556.1 |
| 6,690,417 B1 * | 2/2004 | Yoshida et al. ............ 348/231.1 |
| 6,731,952 B2 * | 5/2004 | Schaeffer et al. ............ 455/557 |
| 6,738,643 B1 * | 5/2004 | Harris ..................... 455/556.1 |

* cited by examiner

*Primary Examiner*—Blane J Jackson

(57) ABSTRACT

A system and a method for remotely storing information from portable electronics using a multi-point wireless link. The method and system involves a Bluetooth-enabled camera that communicates to a 3G cellular telephone via a Bluetooth wireless link, the telephone then uses the 3G wireless link to connect to a remote storage device via the Internet. Using this concept, the internal memory of the portable device is used as a buffer memory without needing to be in the vicinity of a computer because the cellular telephone can act as a go between from the portable device to the storage space via the Internet.

7 Claims, 2 Drawing Sheets

REMOTE DATA STORAGE AND RETRIEVAL FOR PORTABLE ELECTRONICS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a portable electronic device, and in particular to using a combination of local and remote storage to enhance the storage capability of the portable device. Still more particularly, the invention relates to using a wireless link to permit a portable electronic device, such as a camera, to offload some or all of its data (e.g., pictures).

2. Background Information

Portable electronics are quickly becoming commonplace in many households. Everything from digital cameras, portable personal computers ("PCs"), portable music players (such as the MP3 player that plays MPEG3 ("Motion Picture Experts Group layer 3") encoded files), and other devices are decreasing in price so that they are now available to the average consumer. Consumers also demand that in addition to these electronic devices being cheap, they must be capable of performing a variety of tasks and functions.

For example, digital cameras are expected to provide images of comparable quality to traditional cameras, and be able to take at least as many as are pictures available in a standard roll of film (e.g., 24, 36). Picture quality in digital cameras is directly related to the resolution of the picture. Resolution of an image is defined by the number of "pixels" (picture elements) in an image. An image with fewer pixels per square inch (i.e., lower resolution) will not look as sharp as an image of comparable size but with more pixels (i.e., higher resolution). For obvious reasons, consumers desire digital pictures having a high resolution, and resolution at least comparable to that provided with conventional cameras and traditional film. However, increasing the resolution of an image (by increasing the number of pixels per square inch) increases the size of the file of the resulting picture. The images are stored locally in the digital camera's memory, which has finite capacity. Thus, the number of pictures the camera can take is limited by the resolution of the images and the camera's internal memory capacity. Other types of portable electronic devices, such as digital audio players (MP3 players) and dictation systems also share this same problem of limited memory capacity.

The electronics industry has attempted to address this problem by introducing "memory cards". Most portable electronics now have some sort of memory card that can be removed from the device by the user and replaced by another memory card. This requires the user to purchase additional memory cards, which are device specific and generally quite costly. Users are also required to carry extra memory cards anticipating how much memory they will require. Accordingly, a solution to this problem is needed.

BRIEF SUMMARY OF THE PREFERRED EMBODIMENT OF THE INVENTION

The problems noted above are solved in large part by a system and a method for remotely transmitting information from a portable electronic device for storage to a remotely coupled storage device. The portable electronic device preferably communicates with an intermediate electronic device, which in turn communicates with a remote storage device. One preferred embodiment of the portable electronic device is a Bluetooth-enabled camera that communicates to a cellular telephone via a Bluetooth wireless link. The telephone may then use a 3G wireless link and the Internet to communicate with a remote device such as a server, an application service provider ("ASP") and the like. Providing a communications link from a portable device to a remote device advantageously permits the portable device to offload some or all of its data (e.g., pictures in the embodiment in which the portable device is a camera,) thereby reducing the reliance on the local memory of the portable device.

The camera can be configured for any one of a plurality of operational modes such as real-time upload, automatic upload or manual upload. In real-time mode the portable electronic device generally transfers its data as the data is acquired and as quickly as the wireless connections will allow. Automatic mode senses when the camera's memory is nearly full, or otherwise reaches a predetermined or programmable threshold and initiates a connection, transfers data and then disconnects. Manual mode lets the user decide when to perform the upload by activating a control on the portable electronic device.

In an alternate embodiment, the intermediate electronic device comprises a portable or handheld computer, which includes both Bluetooth and 3G radios. Yet another embodiment is with the intermediate electronic device comprising a portable computer, which also has Bluetooth and 3G radios.

Another embodiment enables rapid access to pictures taken at remote sites. If the home server which communicates to the cellular telephone has preset mail groups, it is possible to broadcast photos directly from a remote site via the method of the preferred embodiment. The ASP, which can also receive data from the portable electronic device, can perform valuable functions on this data, like data base storage and administration services. In yet another embodiment, a PocketPC or portable computer (or any other intermediary device with storage capability) is used instead of the cellular telephone, the camera may off-load to it in any of the previously mentioned modes, and the PC initiates the connection. With this configuration multiple upload destinations can be supported due to the fact that the PC also has its own storage capability and can therefore buffer data.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The term "Bluetooth" refers to a de-facto open standard for short range digital radio. The specification includes air interface protocols to allow several Bluetooth applications to intercommunicate simultaneously, and to overcome external sources of interference. Bluetooth communications are generally limited to 10 m, or about 30 feet, and data throughput can be as high as 1 megabits per second ("Mbps").

The term "3G" also called Universal Mobile Telecommunications System ("UMTS") refers to a communication protocol that provides packet-based transmission capabilities for data and speech at data rates up to 2 Mbps. Via a redundant network of satellites and Internet protocols, 3G provides an "always on" connection where data transfer is readily available throughout much of the world.

The term "ASP" ("Application Service Provider") refers to an entity that provides individuals or companies access over the Internet to applications and related services.

DETAILED DESCRIPTION OF THE PREFERRED EMBODIMENTS

In accordance with the preferred embodiment of the invention, a portable electronic device permits a user to transfer data to a remote server rather than having to carry additional memory cards anticipating usage requirements. As explained below, the data being transferred can include images, audio, medical measurements, or any other type of digital data. The portable electronic device permits a user to take data that is acquired and or stored in the device and offload the data to an external remotely coupled device to make room for more data in the portable electronic device. For example, pictures in a digital camera can be offloaded to a web-based server through the user's cell phone eliminating the need for the user to carry extra memory cards.

Figure 1:
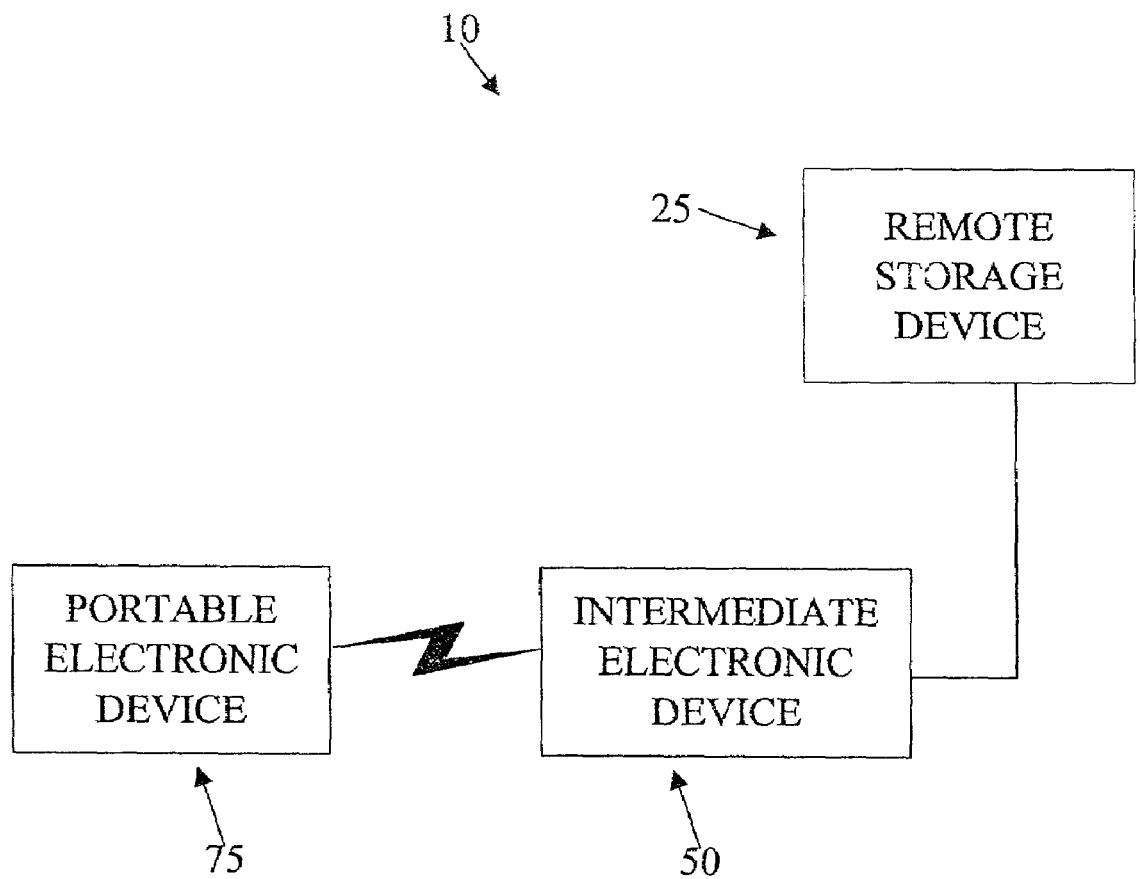
FIG. 1 shows a general system with a portable electronic device transferring data between the remote storage device.

There are numerous embodiments for remotely transferring information for a portable electronic device. FIG. 1 shows a general embodiment of the present invention. Referring to FIG. 1, system 10 comprises a portable electronic device 75 coupled to an intermediate electronic device 50, which is also coupled to a remote storage device 25. Portable electronic device 75 and intermediate electronic device 50 preferably are in the user's possession and control while remote storage device 25 may be a separately controlled device on the Internet or other type of network. The portable electronic device 75 can be any device that may be used to collect data that may be stored digitally, such as a digital camera, a voice recorder, or medical diagnostic equipment to name a few. In the event that device 75 does not have enough capacity to store the data, the user can then transmit it to remote storage 25 via an intermediate electronic device 50. The remote data storage 25 may be any device that is coupled via the Internet to the intermediate electronic device 50 and that can store data. The remote storage device 25 may comprise a home-based computer, a remote file server, a mass storage device (e.g., hard drive, write able CD-ROM, etc.), or any type of remotely coupled device that includes storage capacity. Preferably, the intermediate electronic device 50 communicates with portable electronic device 75 via a wireless connection such as Bluetooth. Further, intermediate electronic device 50 preferably sends data to and/or receives data from remote storage device 25 via a combination of a wireless link such as "3G" and the Internet. Although the preferred communication methods used in system 10 include Bluetooth and 3G, other methods that allow the user of the portable electronic device 75 to transfer data remotely including combinations of wireless connections and wired connections are also possible.

With the configuration shown in FIG. 1, portable electronic device 75 can offload its data through intermediate electronic device 50 to remote storage device 25. The portable electronic device 75 can offload its data during normal operation. If the portable electronic device 75 comprises a digital camera, for example, a user can use the camera to take one or more pictures and then cause the camera to transfer one or more of the pictures through intermediate electronic storage device 50 to remote storage device 25. This frees up the memory in the camera for taking more pictures without having to swap out memory cards as in conventional systems. As explained below, the intermediate electronics device 50 could comprise a cell phone equipped to receive the pictures from the camera via a Bluetooth communication protocol and then pass on those pictures to the remote storage via 3G and various well-known Internet infrastructure communication mechanisms (routers, switches, etc.)

Figure 2:
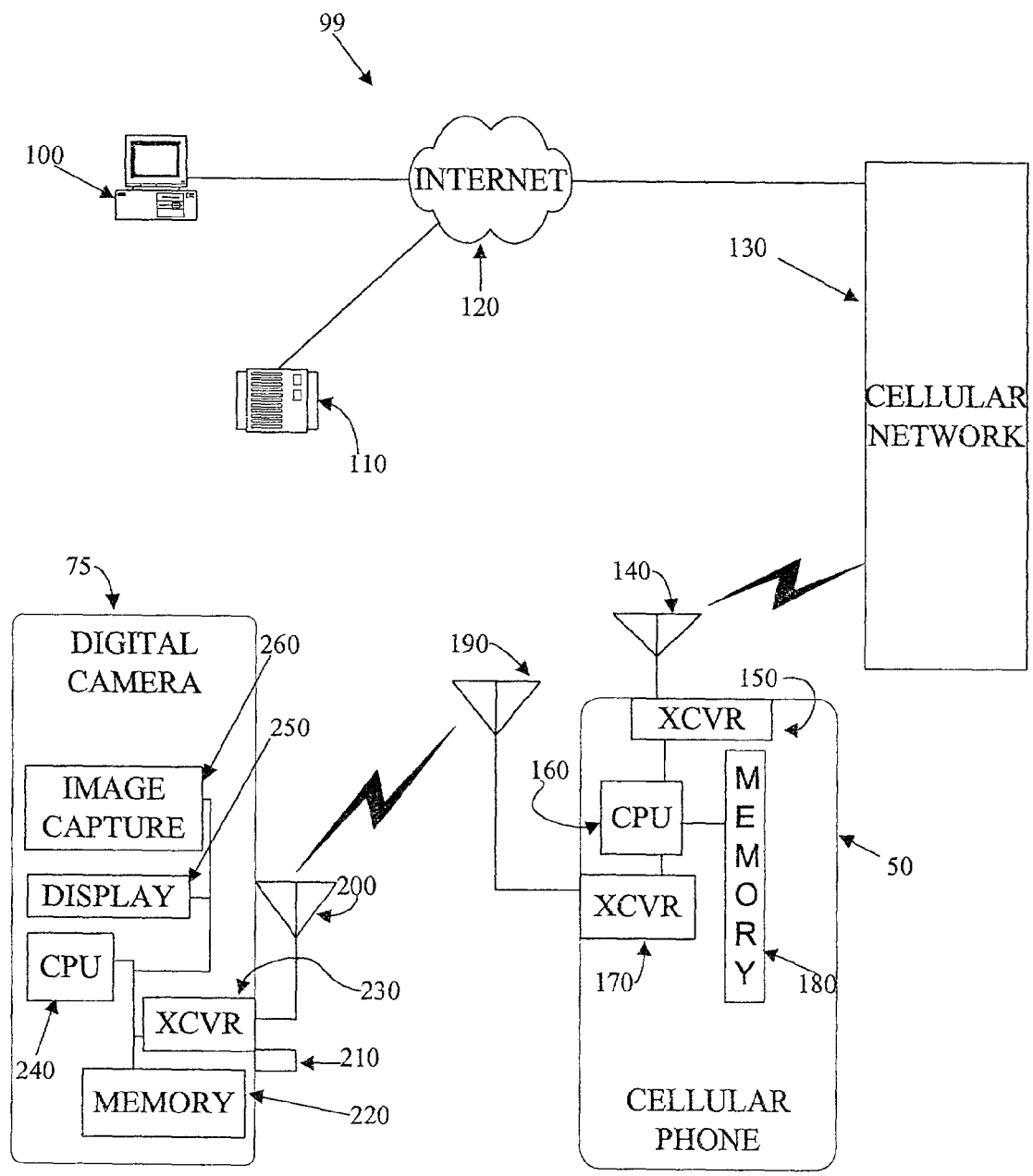
FIG. 2 shows a Bluetooth enabled digital camera transferring images to and from a remote server.

FIG. 2 shows an embodiment of a system 99 that uses a digital camera for device 75 and a cellular telephone for device 50. Referring to FIG. 2, a camera 75, cell phone 50, a cellular network 130, home-based server 100, an ASP 110, and the Internet 120 are shown intercoupled by wired and wireless networks. As shown, the digital camera 75 preferably comprises memory 220, a user interface 210, a radio frequency transceiver 230, a display 250, an image capture device 260, and a central processing unit ("CPU") 240. The transceiver 230 preferably transfers data to and from the cell phone 50. The transmission protocol may be any suitable protocol such as the well-known Bluetooth standard as noted above. As such the transceiver 230 may be a CX72303 model manufactured by Conexant. The transceiver 230 is coupled to a radio frequency antenna 200 that is able to transmit and receive Bluetooth radio frequency signals. The image capture device 260 serves to capture images in an electronic form. The display 250 preferably is used to view images both before and after they are taken. Additionally, the user can also read status information about the camera from the display 250, such as the amount of memory remaining, the current mode of operation, the amount of battery life remaining, and any other parameter as desired. The user interface 210 may be used as an interface between the user and the camera 75 allowing the user to select different modes of operation for example. The CPU 240 is used to process data in the camera and can be a Pentium® processor by Intel or any other variant evident to one of ordinary skill in the art. The memory unit 220 preferably is used to store data and may be the removable "memory cards" as noted above, or it may be non-removable type.

The cell phone 50 of the preferred embodiment comprises at least two transceivers 150 and 170, memory 180, and a CPU 160. The cell phone 50 preferably receives pictures from camera 75 via transceiver 170 and forwards the pictures to the cellular network 130 via suitable protocols and/or speeds using transceiver 150. Transceiver 170, and its associated antenna 190 provides a wireless communications link between the camera 75 and the cell phone 50. As such, if transceiver 230 comprises a Bluetooth transceiver, so does transceiver 170. Preferably, transceiver 150 transfers data to and from the cellular network 130, which is coupled to the Internet. The cellular network (which comprises cell towers, base stations, etc.) is capable of communicating with the cell phone 50 via any suitable wireless protocol, although 3G is preferred as described below. If cell phone 50 communicates with cell network 130 using 3G, transceiver 150 comprises a 3G transceiver such as TRF6150 provided by Texas Instruments.

The 3G cellular communication protocol is preferred due to its packet-switching transmission capabilities that make it amicable for data transmission. In earlier cellular communications protocols each data transfer would create a circuit that would reserve the path between the two parties for the entire data transfer session (this is known as circuit-switching.) Data networks (like the Internet) on the other hand transfer data much differently using packet-switching. Both circuit-switched and packet-switched networks may break data files into packets if the data exceeds a predetermined size. With packet-switching, routers dynamically determine a path for each individual packet of data, and packets are arbitrarily arranged to use any path available to get to the destination. Unlike circuit-switching, no one data transfer takes up an entire path for an entire transfer session, and data is sent only when data is present. Hence, during pauses in a data transfer, the channel is filled with pieces of other data transfers. Because one transfer does not require an entire circuit, the network can provide what appears to be an "always on" connection, where the user seamlessly can transfer data without having to worry about circuit availability. Because 3G and Bluetooth are packet-switching protocols, they can provide a data path to the remote server 100 that is "always on" where the camera 75 can send and receive images as needed.

In another embodiment, system 99 of FIG. 2 can also use an iPaq pocket PC from Compaq Computer Corporation, or other portable computer as the intermediate electronic device 75. In this case, the pocket PC or portable computer would comprise a Bluetooth transceiver 170 and a 3G transceiver 150, and could therefore facilitate a transfer between the portable device 75 and the cellular network 130 that is coupled to the Internet 120. In this configuration, the iPaq pocket PC or portable computer could use local memory 180, comprising non-volatile (e.g., hard disk) or volatile (e.g., RAM) to further buffer the data in response to network delays.

Referring again to the preferred embodiment of FIG. 2, system 99 also includes a home-based server 100 coupled to the Internet 120. As would be evident to one of ordinary skill in the art, the home-based server 100 comprises a CPU, hard disk, memory, and Internet access such as a modem, network interface card, or a cable modem. Having access to the Internet 120, the server 100 can transfer data to and from the camera 75 by the array of wired and wireless connections as explained above. Therefore, when a data transfer is desired, a user may cause the camera 75 to transfer data remotely to the storage space of the remote home-based server 100 via the user's cell phone 50. The cell phone 50 then transmits the pictures through the cellular network 130 (preferably using 3G) to the home-based server 100 for storage thereon. If desired, the camera 75 may also receive data (e.g., pictures) by the reverse process comprising the home-based server 100 transmitting to the cellular network 130 via the Internet 120, the cellular network 130 then transmitting data to the intermediate electronic device 50 (preferably using 3G), the device 50 transmitting to the portable electronic device 75 (preferably using Bluetooth). The data may then be displayed on display 250 or stored into the camera's local memory 220.

The embodiment of FIG. 2 may also include an ASP server 110. As mentioned above, the ASP is an entity which may provide any type of services and functions such as data storage, database management, and broadcasting of images through email to name a just few. Images from the camera 75 may therefore be stored on a home-based server 100 as mentioned above or on an ASP 110 in a similar manner. Once ASP 110 has the data, it may then perform functions on it including broadcasting data to users throughout the Internet 120.

The user then has many options in reviewing the images that have been remotely stored. As mentioned before, the images can be downloaded from the remote home-based server 100 or the ASP 110 to the camera 75 and be reviewed remotely. Preferably, the home-based server 100 is the user's own computer and as such the user can review images upon returning home. If the images were transferred to the ASP 110, the user may also access it through the Internet 120, and download the files from it to the home computer 100. The ASP 110 may also broadcast these images through an automated email distribution list, or may automatically post them to a web site, which can then be accessed by multiple users.

System 99 of FIG. 2 offers distinct advantages over other systems. Preferably, the portable electronic device 75 is a Bluetooth equipped digital camera and the intermediary electronic device 50 is a 3G cellular telephone. In this arrangement, the home-based server 100 does not have to be Bluetooth enabled in order for the camera to transfer data between them. Also, the camera is not restricted to the proximity (30 ft for Bluetooth) of the home-based server 100. Instead the 3G cellular telephone only needs to be within sufficient proximity of the camera (approximately 30 ft if Bluetooth is used), and it can then transfer data to the home-based server 100 via the cellular network 130 and the Internet 120. Likewise with the ASP 110, Internet connectivity is all that is required to give the ASP access to the Bluetooth equipped digital camera. The user of the digital camera can transmit data to the home-based server 100 or ASP 110 for storage from anywhere the user has access to a 3G network by simply carrying a cellular telephone. The user would no longer be required to purchase costly additional memory because the camera can now dynamically transfer data to a remote storage device in three different modes: real-time, automatic, or manual.

The real-time mode of data transfer between the digital camera and the home-based server 100 is where the camera is permitted to transfer data to the home-based server 100 as quickly as the wireless connections will allow. The camera's memory can therefore act as a buffer and the data transfer process may seem invisible, where the user may not notice whether data is being stored remotely or to local memory.

When operating in automatic mode, the camera senses when the memory is full or nearly full based upon a threshold value. The user can set the threshold to any desired percentage of memory using the user interface 210. Accordingly, when the camera detects the memory to be full or nearly full, it initiates a connection to the cell phone, transfers data and then disconnects.

In manual mode the user decides when to perform the transfer. The memory capacity remaining may be displayed on display 250. The user may then arbitrarily decide to transfer data using the user interface 210. The camera would then fulfill the user's request by making a connection to the cell phone, transferring the data, and then disconnecting.

In another hybrid mode, the camera 75 may be set in manual data transfer mode, but the camera 75 may also initiate an automatic transfer if the buffer is getting full in the event that the user hasn't started a data transfer in time.

Data transfer preferably occurs in one of the three primary modes with the user accessing the user interface 210 to toggle between the three modes. The user interface 210 may be a series of push buttons that the user can use to provide feedback to the camera 75. A first push button may then be used to toggle between modes, where a user may depresses the button and the camera 75 toggles from say real-time mode to automatic mode for example. If the first push button is used to put the camera 75 in manual mode, then a second push button of the user interface 210 may be used to effectuate the data transfer to the cell phone 50.

The above discussion is meant to be illustrative of the principles and various embodiments of the present invention. Numerous variations and modifications will become apparent to those skilled in the art once the above disclosure is fully appreciated. For example, as noted above, other types of wireless communication protocols other than Bluetooth and 3G may be used to achieve the same result. Also, the use of a digital camera for device 75 and a cellular telephone for device 50 is not meant to be restrictive, and as such other devices may be freely interchanged while still achieving the same effect. Accordingly, although the preferred embodiment uses an image capture device 260, a display 250, and a user interface 210 other variations may not necessarily require them. Furthermore, other hybrid data transfer modes exist and the above discussion is not meant to be an exhaustive list of all combinations of data mode transfer. Additionally, the user interface 210 as described herein is shown to be at least one push button, it should be noted that the user interface 210 is a means to convey the user's wishes to the camera 75, and as such may take on many different forms. It is intended that the following claims be interpreted to embrace all such variations and modifications.

What is claimed is:

1. A portable electronic device, comprising:
    a CPU;
    a transceiver coupled to said CPU, said transceiver capable or wireless communications;
    a memory unit coupled to said CPU; and
    an image capture device coupled to said CPU, said image capture device acquires an image;
    wherein said transceiver wirelessly transmits said image to a remote storage device through an intermediate electronic device;
    wherein said transceiver begins transmitting said image when said CPU determines said memory to have reached a threshold.

2. The portable electronic device of claim 1, wherein said threshold is programmable.

3. The portable electronic device of claim 2, wherein said transceiver is further capable of Bluetooth wireless communications.

4. The portable electronic device of claim 1, wherein said transceiver of said portable electronic device may receive images from said remote storage device.

5. The portable electronic device of claim 4 wherein said transceiver is further capable of Bluetooth wireless communications.

6. A method for remote data storage and retrieval for portable electronics, comprising:
    (a) acquiring an image with a digital camera;
    (b) transmitting said image to cellular telephone using Bluetooth wireless communications;
    (c) further transmitting said image to a cellular network using 3G wireless connection, wherein said cellular network is also connected to the Internet; and
    (d) further transmitting said image to a remote storage device, wherein said storage device is also connected to the Internet;
    wherein said digital camera further includes a central processing unit ("CPU") and memory, and wherein the transmission of said image begins when said CPU determines said memory to have reached a threshold.

7. The method of claim 6 wherein said threshold is programmable.

* * * * *

UNITED STATES PATENT AND TRADEMARK OFFICE
CERTIFICATE OF CORRECTION

| | | |
|---|---|---|
| PATENT NO. | : 7,526,314 B2 | Page 1 of 1 |
| APPLICATION NO. | : 10/080999 | |
| DATED | : April 28, 2009 | |
| INVENTOR(S) | : Richard Kennedy | |

It is certified that error appears in the above-identified patent and that said Letters Patent is hereby corrected as shown below:

In column 8, line 5, in Claim 1, delete "or" before "wireless" and insert -- of --, therefor.

Signed and Sealed this

Tenth Day of November, 2009

David J. Kappos
*Director of the United States Patent and Trademark Office*